United States Patent [19]
Pearce et al.

[11] Patent Number: 5,910,951
[45] Date of Patent: *Jun. 8, 1999

[54] TRANSMITTING DEVICE WITH MOBILITY MANAGER AND METHOD OF COMMUNICATING

[75] Inventors: Michael David Pearce, Barrington; Rodd Bryan Zurcher, Schaumburg; Lewis B. Oberlander, Buffalo Grove, all of Ill.

[73] Assignee: Motorola, Inc., Schaumburg, Ill.

[*] Notice: This patent issued on a continued prosecution application filed under 37 CFR 1.53(d), and is subject to the twenty year patent term provisions of 35 U.S.C. 154(a)(2).

[21] Appl. No.: 08/720,984

[22] Filed: Oct. 15, 1996

[51] Int. Cl.$^6$ .................................................. H04L 12/28
[52] U.S. Cl. ............................................................ 370/351
[58] Field of Search .................................... 370/328, 338, 370/401, 465, 471, 464, 351, 444; 455/445, 446, 557, 452, 453; 375/200.76

[56] References Cited

U.S. PATENT DOCUMENTS

| | | |
|---|---|---|
| 5,301,359 | 4/1994 | Van den Heuvel et al. . |
| 5,388,089 | 2/1995 | Odaka et al. . |
| 5,425,023 | 6/1995 | Haraguchi et al. . |
| 5,544,222 | 8/1996 | Robinson et al. .................... 455/557 |
| 5,657,314 | 8/1997 | McClure et al. . |
| 5,673,265 | 9/1997 | Gupta et al. .......................... 370/432 |
| 5,682,460 | 10/1997 | Hyziak et al. . |
| 5,721,762 | 2/1998 | Sood ..................................... 455/466 |
| 5,752,193 | 5/1998 | Scholefield et al. .................. 455/452 |
| 5,761,621 | 6/1998 | Sainton ................................. 455/453 |

OTHER PUBLICATIONS

BHA Mobile Data Group; "Mobile Data Communications—Easy ACCESS Wireless Enabling Service"; May 27, 1996.
BHA Computer Pty Ltd; "Easy ACCESS Wireless Enabling Service–Features Overview"; May 27, 1996.

Primary Examiner—Ajit Patel
Assistant Examiner—Chiho Andrew Lee
Attorney, Agent, or Firm—Terri S. Hughes

[57] ABSTRACT

A transmitting device (15) for communication over a multiplicity of networks having a communication manager (22) and a mobility manager (20). The mobility manager (20) includes a database (40) having a net table (42) of potential networks and a filter (38). The filter (38) generates a prioritized list of qualifying networks over which a data object is to be transferred. Also described is a method for sifting through and filtering the net table (42) of potential networks and their characteristics. A prioritized list of qualifying networks is generated wherein each qualifying network has a priority. A transmission request is generated based on a combination of the data object and the prioritized list of qualifying networks and is transmitted over the selected qualifying network (26), (28), or (30) having a highest priority.

12 Claims, 3 Drawing Sheets

TRANSMITTING DEVICE WITH MOBILITY MANAGER AND METHOD OF COMMUNICATING

FIELD OF THE INVENTION

This invention relates to a communication device for communication over a number of networks and a method of communication signals over such networks.

BACKGROUND OF THE INVENTION

Currently, users of mobile and portable communication devices are forced to choose only one communication method from the many wide-area wireless mediums available. This is true of most devices even when they are in an office setting and might have an accessible and less expensive local-area wired or even wireless system available. This lack of choice locks the user into one, possibly expensive, communication service based on what the user is currently doing. At best, the user is forced to manually reconfigure the communication device to attach it to the network via another communication method.

BRIEF DESCRIPTION OF THE DRAWINGS

Other advantages and features of the invention are described with reference to preferred embodiments which are intended to illustrate and not to limit the invention and in which.

DETAILED DESCRIPTION OF THE DRAWINGS

Figure 1:
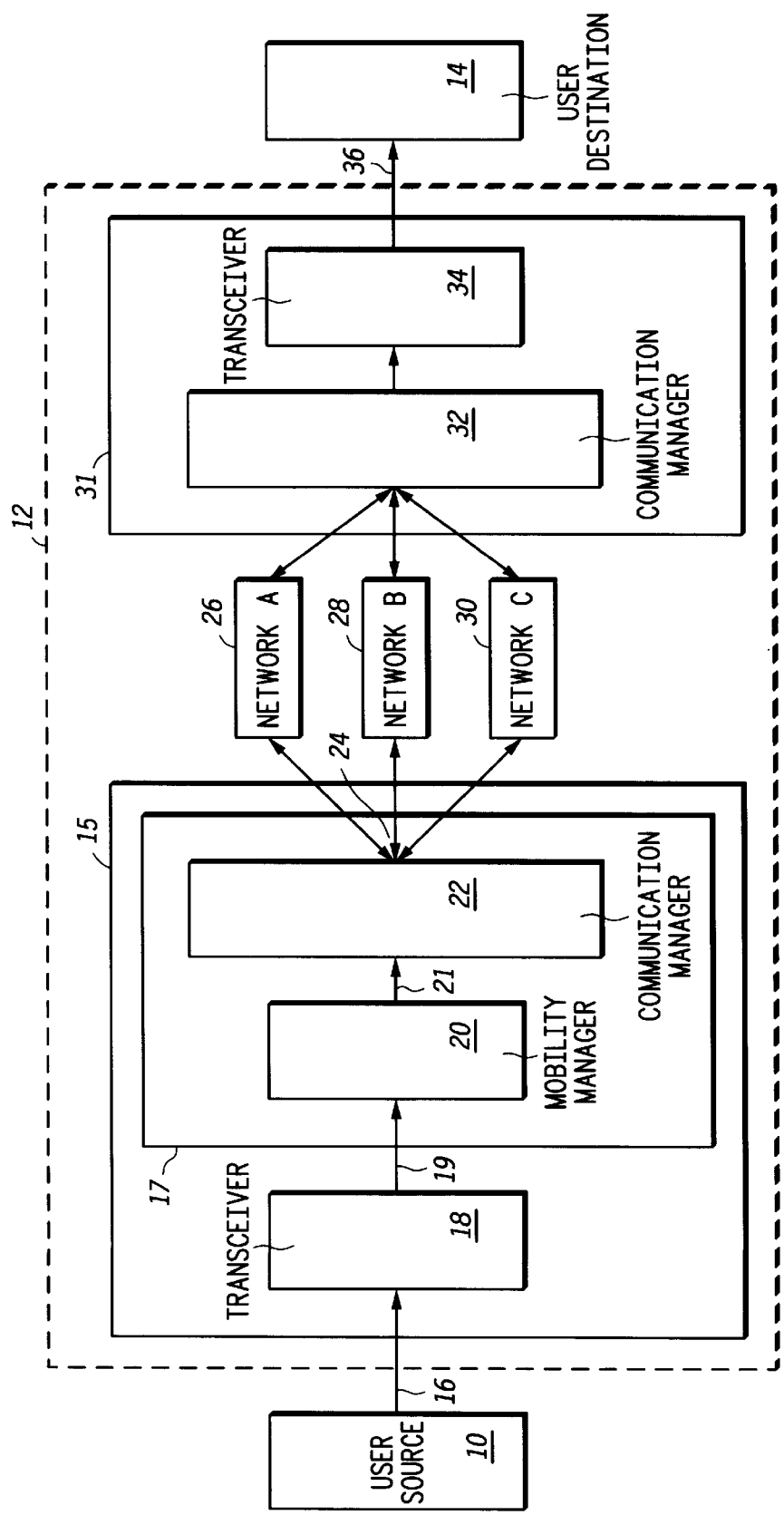
FIG. 1 is a context diagram illustrating a user source, a communication system and a user destination, each in accordance with a preferred embodiment of the invention.

FIG. 1 is a context diagram illustrating a user source 10, a communication system 12, and a user destination 14, each in accordance with a preferred embodiment of the invention. A transmitting device 15 comprises a first transceiver 18 and a processor 17 having a mobility manager 20 and a first communication manager 22, which are software modules running on the processor 17. A receiving device 31 comprises a second communications manager 32 and a second transceiver 34. The transmitting device 15 and the receiving device 31 are connected via some multiplicity of qualifying networks 26, 28, and 30 labeled as network A, network B and network C, respectively. Common examples of the type of networks available are the following: Cellular Digital Packet Data (CDPD), circuit-switched cellular, paging, etc. Of these networks, some subset is available for communication at any given time.

Figure 2:
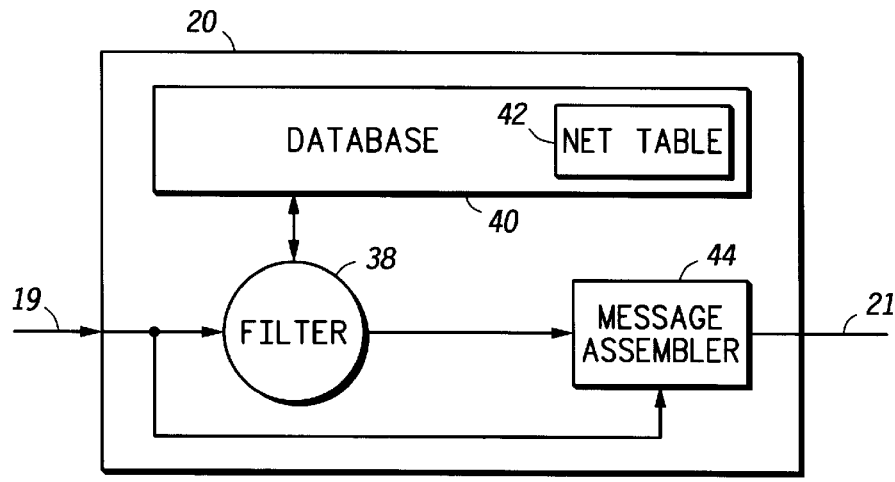
FIG. 2 is a block diagram of a mobility manager, in accordance with the preferred embodiment of the invention.

FIG. 2 is a block diagram of the mobility manager 20. The mobility manager 20 comprises a filter 38, a database 40, and a message assembler 44. It further has a first interface 19 to which the filter 38 is coupled and a second interface 21 coupled to the message assembler 44.

In operation, the user source 10 sends a data object, along with its attributes (e.g., size, priority, sender, etc.), across an input interface 16 to the first transceiver 18. The first transceiver 18 passes the data object across the first interface 19 and into the filter 38 of the mobility manager 20. The data object is also passed to the message assembler 44. The filter 38 sifts through the database 40 which stores a net table 42 of potential networks and their characteristics which the transmitting device 15 is capable of connecting with in order to transmit the data object from the transmitting device 15 to the receiving device 31. Once the filter 38 sifts through the net table 42 of potential networks and their characteristics, the filter 38 performs a filtration function. The filtration function is based on a combination of the attributes of the data object (i.e., size, priority, sender, etc.) and the characteristics of the potential networks, such as cost (whether it is cost per byte, whether it is cost per minute, and whether the cost changes during the day or week), speed, and whether the potential network is a circuit-switched (e.g., analog cellular, Plain Old Telephone System (POTS) modem, Integrated Services Digital Network (ISDN), etc.) or a packet-switched (e.g., Ethernet, paging, etc.) network which can influence priority ordering based on, for example, the size of the data object. Once the filter 38 completes the filtration function, the filter 38 generates a prioritized list of qualifying networks with varying priorities over which this particular data object may be transferred (this list may be smaller than the list of all potential networks if the data object does not qualify for transmission over one or more of the potential networks for cost or priority reasons).

Figure 3:
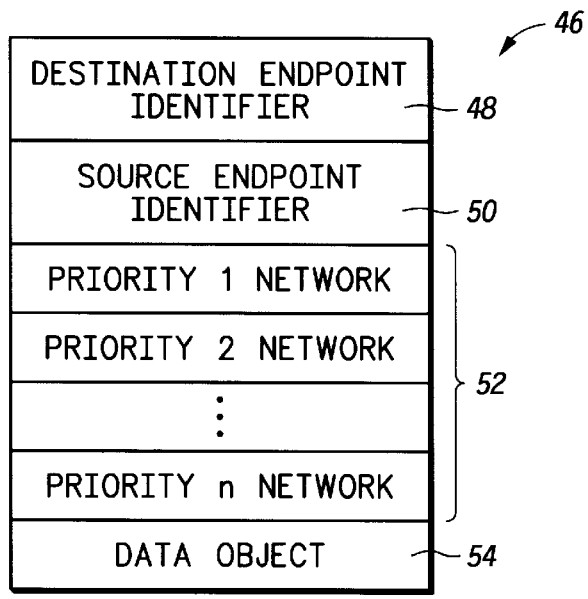
FIG. 3 is an illustration of the structure of a transmission request in accordance with the preferred embodiment of the invention.

As soon as the prioritized list of qualifying networks is generated, the filter 38 transmits the prioritized list of qualifying networks to the message assembler 44 to enable the message assembler 44 to append the prioritized list of qualifying networks to the data object. Once appended, a transmission request 46, as shown in FIG. 3, is created comprising a destination endpoint identifier 48, a source endpoint identifier 50, the prioritized list of qualifying networks 52 (e.g., priority 1 network, priority 2 network, etc.), and the data object 54. The message assembler 44 passes the transmission request across the second interface 21 to the first communication manager 22.

The actual process of transmitting the data object from the transmitting device 15 to the receiving device 31 via any one of the connecting networks 26, 28, or 30 is well known in the art as a standard method of fragmentation, transmission, and collection of per-block checkpoint/acknowledgments. Note that this does not imply a stop-and-wait reliability protocol, as collection of checkpoint/acknowledgments is decoupled from transmission of blocks.

Figure 4:
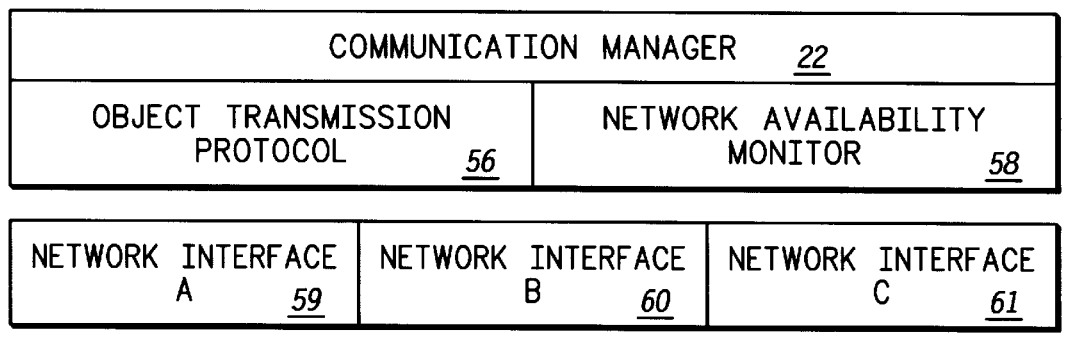
FIG. 4 is an illustration of a communication protocol software organized as a single communication manager process residing on a transmitting device of FIG. 1.

FIG. 4 is an illustration of a communication protocol software organized as the first communication manager 22 process residing on the transmitting device 15 of FIG. 1. The first communication manager 22 comprises the following components: an object transmission protocol 56, a network availability monitor 58, a network interface A 59, a network interface B 60, and a network interface C 61. Each of the object transmission protocol 56 and the network availability monitor 58 interfaces with all of the network interfaces 59, 60, and 61.

In operation, the first communication manager 22 accepts transmission requests from the mobility manager 20. Upon successfully receiving the transmission request with the prioritized list of qualifying networks, the first communication manager 22 transmits the transmission request to the receiving device 31 over the highest-priority qualifying network via a transport layer connection 68 and a listener module 72 (refer to FIG. 5). Procedures for transmitting and receiving transmission requests while automatically switching among qualifying networks result in the transmission request being transferred reliably over the highest-priority qualifying network available for that transmission request. The first communication manager 22 will resort to a lower-priority qualifying network only when all higher-priority qualifying networks have been deemed unavailable. If the first communication manager 22 resorts to a lower-priority qualifying network, it will re-attempt to transmit the transmission request over a higher-priority qualifying network when it becomes available.

Figure 5:
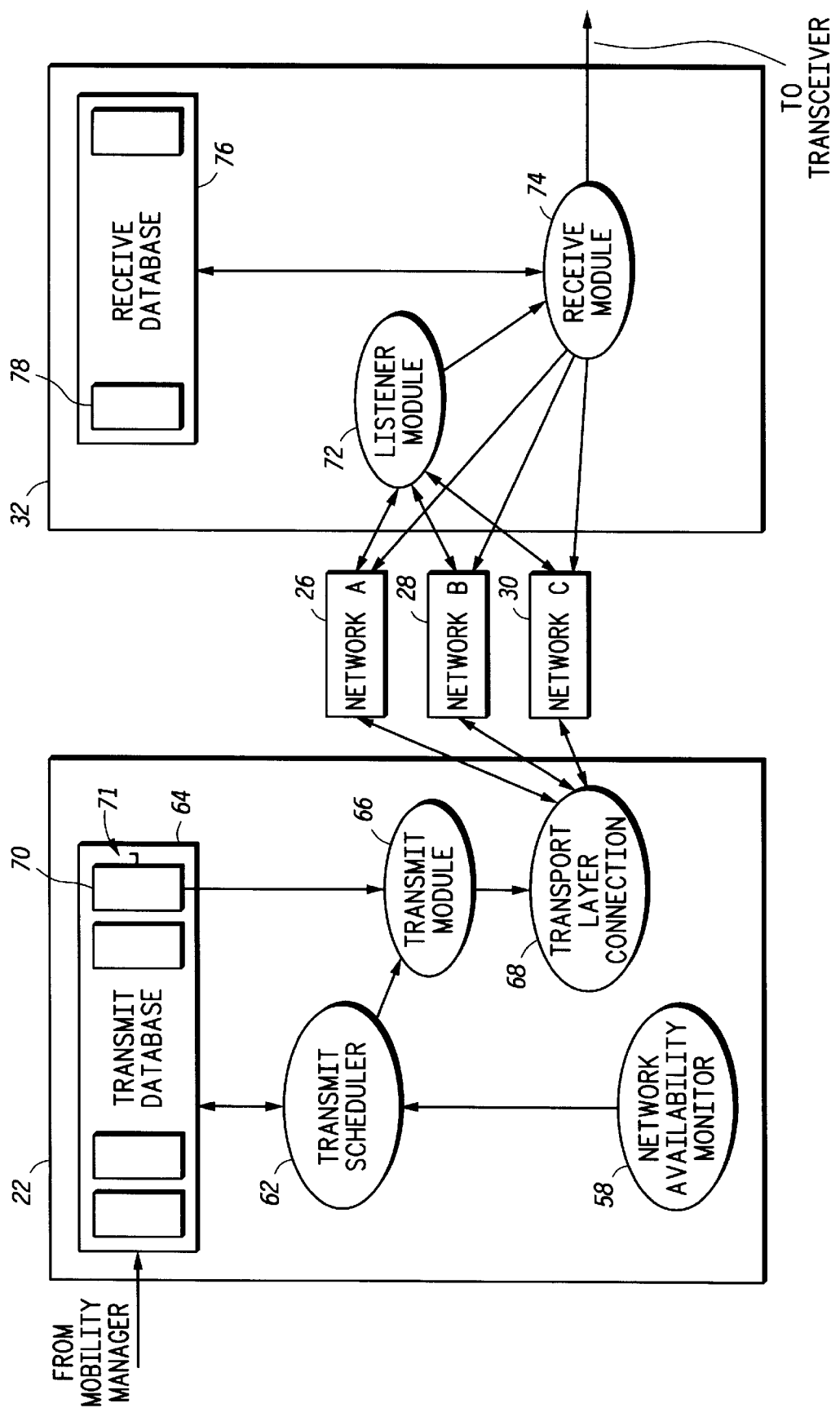
FIG. 5 is a data flow diagram of the communication manager residing on the transmitting device and the communication manager residing on a receiving device, in accordance with the preferred embodiment of the invention.

FIG. 5 is a block diagram of the first communication manager 22 and the second communication manager 32, in accordance with the preferred embodiment of the invention. The first communication manager 22 further comprises a network availability monitor 58, a transmit scheduler 62, and a transmit database 64. A transmit module 66 is created by the transmit scheduler 62, as needed, for each transmission session. Network availability is determined on demand by the network availability monitor 58. The implementation of this network availability monitor 58 may take several forms so long as the transmit scheduler 62 is provided with sufficient network availability information. One possible implementation involves sending an echo request over the network in question when queried for the availability of that network. The resulting "extra" traffic can be reduced by caching network availability information, and sending echo requests only when cached information is "stale" or when a suspected network availability change has taken place. Due to its simple nature, this method is particularly preferred.

Another possible implementation of the network availability monitor 58 involves closer integration with each network's built-in management functions, such as receive signal strength and/or bit error rate indications. By having the network availability monitor 58 keep track of all or part of a network's availability, the communication endpoint is relieved of maintaining this information. The added benefit of reduced traffic through reduced duplication of effort may not justify the complexity of this solution. A third implementation, for example, utilizes a bulletin board as described in U.S. Pat. No. 5,301,359.

In operation, the transmit database 64 receives a transmission request from the mobility manager 20. A flag 71 is associated with every transmission request to indicate a first portion of the transmission request that has been successfully transmitted to the receiving device 31 and a second portion of the transmission request that has not been successfully transmitted to the receiving device 31. The flag 71 for each transmission request is initially set at a beginning of the transmission request. A feed-back mechanism in the object transmission protocol 56 allows the flag 71 to move to a new position in the transmission request every time a block of the transmission request is successfully received by the receiving device 31. The feed-back mechanism is implemented as a result of the object transmission protocol 56 on the receiving device 31 informing the object transmission protocol 56 on the transmitting device 15 how much data was successfully received. Thus, as the receiving device 31 successfully receives data from the transmitting device 15, the object transmission protocol 56 on the receiving device continually updates the object transmission protocol 56 on the transmitting device 15 as to how much data was successfully received by the receiving device 31. Upon successfully receiving the transmission request in its entirety, the receiving device 31 transmits the transmission request to the user destination 14.

Upon the transmit database 64 receiving a transmission request, the transmit scheduler 62 attempts to immediately transmit the transmission request on the highest-priority qualifying network for the transmission request. A transmission request can be in one of two states: a shelved transmission request (not being transmitted) or an unshelved transmission request (being transmitted on one of its qualifying networks). The invariant maintained is that each transmission request is always being transmitted on the highest-priority qualifying network (in the context of each transmission request), or shelved if there are no qualifying networks available.

The network availability monitor 58 continually updates the transmit scheduler 62 regarding availability of the qualifying networks. When the network availability monitor 58 detects a newly available network, the transmit scheduler 62 scans the transmit database 64 for transmission requests which qualify for transmission on the newly available network and processes them in the following manner. For each shelved transmission request which qualifies for transmission on the newly available network, the transmit scheduler 62 unshelves the transmission request and creates a transmit module 66 for it over the newly available qualifying network. Since the transmission request was shelved, none of its qualifying networks were previously available. Therefore, when any one of its qualifying networks became available, that network is by definition the highest-priority qualifying network available for that particular transmission request.

For each unshelved transmission request which qualifies for transmission on the newly available network, the transmit scheduler 62 compares the priorities of the newly available network and the qualifying network currently being used by the transmission request. If the newly available qualifying network has a higher priority than the qualifying network currently being used, the transmit scheduler 62 destroys the transmit module 66 currently being used, and creates a new transmit module over the newly available qualifying network. If the newly available qualifying network has a lower priority than the qualifying network currently being used, the transmit scheduler 62 allows the transmit module 66 currently being used to continue transmitting the transmission request. Thus, the transmit module 66 currently being used is only preempted for higher-priority qualifying networks so that the transmission request is always transmitted to the receiving device 31 on the highest-priority qualifying network.

When the network availability monitor 58 detects a loss of network availability, the transmit scheduler 62 scans the transmit database 64 for transmission requests that are affected and processes them as follows. The transmit scheduler 62 ignores all of the shelved transmission requests. A newly unavailable qualifying network is of no importance to the shelved transmission requests.

For each unshelved transmission request which is currently being transmitted on the newly unavailable qualifying network, the transmit scheduler 62 destroys the transmit module 66 currently being used. Then, for each qualifying network which is of lower-priority than the newly unavailable qualifying network, the transmit scheduler 62 queries the network availability monitor 58 for network availability information. If a lower-priority qualifying network is found to be available, the transmit scheduler 62 creates a new transmit module over the highest-priority qualifying network that is of lower-priority than the newly unavailable qualifying network (i.e., the first lower-priority qualifying network found during the process of querying the network availability monitor 58). Otherwise, the transmit scheduler 62 shelves the transmission request. Thus, the transmit scheduler stops transmitting those transmission requests which were using the newly unavailable network and begins transmitting them on the highest-priority qualifying network available. Given the invariant above, the transmit scheduler 62 only has to check qualifying networks which have a lower-priority than the newly unavailable qualifying network. Only lower-priority qualifying networks are checked when there is a loss of network availability because the transmission request would have been upgraded to a higher-priority qualifying network already, had one been available.

When the transmit module 66 receives the data object, the transmit module 66 connects to a transport layer connection 68 in order to communicate with the second communication manager 32. The second communication manager 32 comprises a listener module 72, a receive module 74, and a receive database 76. The transport layer connection 68 is first coupled to the listener module 72 on the receiving device 31 via a selected network 26, 28, or 30. Once the connection is made, the listener module 72 creates a receive module 74, as needed, in the receiving device 31, to which the transport layer connection 68 is then coupled. The receive module 74 accepts the transmission request in blocks from the transmit module 66 and stores the partially-received transmission request in the receive database 76. The transmit module 66 on the transmitting device 15 connects to the receive module 74 on the receiving device 31 via the transport layer connection 68, the selected network 26, 28 or 30, and the listener module 72. Upon successfully receiving the entire transmission request, the receive module 74 sends it to the user destination 14.

There are various optimizations in the object transmission protocol 56 between the user source and the user destination, such as check-pointing/restart from point of failure and having the user destination 14 transmit network availability change events to the user source 10, in case the user destination 14 has a better view of this information. When data flow is interrupted due to the qualifying network currently being used becoming unavailable and there are no other qualifying networks available over which the transmission request can be transferred, the transmit scheduler 62 shelves the transmission request in the transmit database 64. The first portion of the transmission request that was received successfully by the receiving device 31 is shelved in the receive database 76 until a qualifying network becomes available to transmit the second portion of the transmission request.

When the network availability monitor 58 informs the transmit scheduler 62 that a qualifying network is available over which the second portion of the transmission request can be transmitted, the transmit scheduler 62 retrieves the transmission request from the transmit database 68, creates a new transmit module over the newly available network, and transmits the second portion of the transmission request to the receiving device 31 starting at the beginning of the flag 71. The flag 71 indicates exactly where the transmission request was interrupted, thus preventing the transmit scheduler 62 from re-transmitting the transmission request in its entirety. If none of the qualifying networks are available long enough for the entire transmission request to be successfully transferred before some maximum allotted time passes, the transmission request is destroyed.

Thus, a versatile communication system and method has been described above in which a mobility manager generates a prioritized list of qualifying networks dependent upon attributes of the data object and characteristics of the potential networks. The transmit scheduler then transmits the transmission request over the highest-priority network available. The modular nature of the software elements described above is particularly advantageous in system design and in smooth reliable operation.

The above description has been given by way of example only and modifications of detail can be made within the scope and spirit of the invention.

We claim:

1. A transmitting device for communication over a multiplicity of networks comprising:

a mobility manager, having a database that stores a net table of potential networks which the transmitting device is capable of connecting with, for generating a prioritized list of qualifying networks with varying priorities over which a data object may be transmitted to a receiving device; and a communication manager, coupled to the mobility manager, for determining a highest-priority qualifying network that is deemed available from the prioritized list of qualifying networks over which to transmit the data object from the transmitting device to the receiving device, wherein a lower-priority qualifying network from the prioritized list of qualifying networks is only used to transmit the data object if all higher-priority qualifying networks have been deemed unavailable.

2. The transmitting device according to claim 1, further comprising:

a transmit scheduler, coupled to a transmit database, for attempting to scheduling data objects on the highest-priority qualifying network deemed available;

a network availability monitor, coupled to the transmit scheduler, for determining and monitoring network availability for the net table of potential networks; and a transmit module, coupled to the transmit scheduler, for connecting to a transport layer connection in order to communicate with the receiving device.

3. A method of communicating signals over a multiplicity of qualifying networks, comprising the steps of:

receiving a data object having attributes;

sifting through a net table of potential networks and characteristics of the potential networks;

filtering the net table based on a combination of attributes of the data object and characteristics of the potential networks;

generating a prioritized list of qualifying networks with varying priorities over which a data object may be transmitted to a receiving device; and transmitting the the data object to the receiving device over a highest-priority qualifying network deemed available from the prioritized list of qualifying networks, wherein a lower-priority qualifying network from the prioritized list of qualifying networks is only used to transmit the data object if all higher-priority qualifying networks have been deemed unavailable.

4. A method according to claim 3, further comprising the steps of:

monitoring the qualifying networks through a network availability monitor;

updating a transmit scheduler regarding availability of the qualifying networks;

detecting that a qualifying network currently being used is unavailable; and transmitting the data object over a lower-priority qualifying network.

5. A method of communicating signals over a multiplicity of qualifying networks, comprising the steps of:
- receiving a data object having attributes;
- sifting through a net table of potential networks and characteristics of the potential networks;
- filtering the net table based on a combination of attributes of the data object and characteristics of the potential networks;
- generating a prioritized list of qualifying networks, wherein each qualifying network has a priority;
- transmitting the data object over a highest-priority qualifying network; and
- shelving the data object if a lower-priority qualifying network is unavailable.

6. The method of claim 3, further comprising the steps of:
- monitoring the qualifying networks through a network availability monitor;
- updating a transmit scheduler regarding availability of the qualifying networks;
- detecting that a newly available qualifying network is available;
- comparing a priority of the newly available qualifying network with a priority of the qualifying network currently being used; and
- destroying a transmit module currently being used if the priority of the newly available qualifying network is higher than the priority of the qualifying network currently being used.

7. The method of claim 6, further comprising the steps of:
- creating a new transmit module over the newly available qualifying network if the priority of the newly available qualifying network is higher than the priority of the qualifying network currently being used;
- transmitting the data object over the newly available qualifying network if the priority of the newly available qualifying network is higher than the priority of the qualifying network currently being used; and
- transmitting the data object over the qualifying network currently being used if the priority of the newly available qualifying network is lower than the priority of the qualifying network currently being used.

8. A method of communicating signals over a multiplicity of qualifying networks, comprising the steps of:
- receiving a data object having attributes;
- sifting through a net table of potential networks and characteristics of the potential networks;
- filtering the net table based on a combination of attributes of the data object and characteristics of the potential networks;
- generating a prioritized list of qualifying networks, wherein each qualifying network has a priority;
- transmitting the data object over a highest-priority qualifying network; and
- shelving the data object if there are no qualifying networks available.

9. The method of claim 3, further comprising the steps of:
- flagging the data object with a flag at a beginning of the data object; and
- moving the flag to a new position every time a block of data is transferred successfully.

10. A method of communicating signals over a multiplicity of qualifying networks, comprising the steps of:
- receiving a data object having attributes;
- sifting through a net table of potential networks and characteristics of the potential networks;
- filtering the net table based on a combination of attributes of the data object and characteristics of the potential networks;
- generating a prioritized list of qualifying networks, wherein each qualifying network has a priority;
- transmitting the data object over a highest-priority qualifying network;
- flagging the data object with a flag at a beginning of the data object;
- moving the flag to a new position every time a block of data is transferred successfully;
- detecting that the highest-priority qualifying network currently being used is unavailable;
- detecting that there are no lower-priority networks over which the data object can be transferred;
- shelving the data object in the transmit database;
- detecting that a qualifying network is available;
- unshelving the data object;
- creating a new transmit module; and
- starting transmission of the data object at the flag.

11. The method according to claim 1 further comprising, if the data object is transmitted over the lower-priority qualifying network, switching to a higher-priority qualifying network when the higher-priority qualifying network becomes available.

12. The method according to claim 3 further comprising, if the data object is transmitted over the lower-priority qualifying network, switching to a higher-priority qualifying network when the higher-priority qualifying network becomes available.

* * * * *